(12) United States Patent
Inagaki et al.

(10) Patent No.: US 11,974,657 B2
(45) Date of Patent: May 7, 2024

(54) BRUSH, REPLACEMENT MEMBER FOR BRUSH, AND METHOD FOR USING BRUSH

(71) Applicant: KYOCERA Corporation, Kyoto (JP)

(72) Inventors: Tomohiro Inagaki, Yokohama (JP); Mizuho Hidaka, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 655 days.

(21) Appl. No.: 17/261,914

(22) PCT Filed: Jul. 2, 2019

(86) PCT No.: PCT/JP2019/026307
§ 371 (c)(1),
(2) Date: Jan. 21, 2021

(87) PCT Pub. No.: WO2020/021995
PCT Pub. Date: Jan. 30, 2020

(65) Prior Publication Data
US 2021/0307499 A1    Oct. 7, 2021

(30) Foreign Application Priority Data

Jul. 24, 2018 (JP) .................... 2018-138812
Nov. 26, 2018 (JP) .................... 2018-220592

(51) Int. Cl.
*A46B 13/02* (2006.01)
*A61C 17/20* (2006.01)
*A61C 17/22* (2006.01)

(52) U.S. Cl.
CPC ............ *A46B 13/023* (2013.01); *A61C 17/20* (2013.01); *A61C 17/221* (2013.01)

(58) Field of Classification Search
CPC .............. A46B 13/023; A46B 15/0046; A46B 15/0042; A46B 15/0038; A61C 17/20; A61C 17/221

See application file for complete search history.

(56) References Cited

U.S. PATENT DOCUMENTS

| 5,165,131 A | 11/1992 | Staar |
| 7,979,938 B2 | 7/2011 | Lilley et al. |
| 10,582,762 B2 | 3/2020 | Vukosavljevic et al. |
| 2004/0128778 A1* | 7/2004 | Wong .................. A61C 17/224 15/28 |
| 2017/0020277 A1 | 1/2017 | Barnes et al. |

FOREIGN PATENT DOCUMENTS

| CN | 101249025 A | 8/2008 |
| CN | 101715328 A | 5/2010 |
| CN | 204798046 U | 11/2015 |
| CN | 107361869 A | 11/2017 |
| EP | 3 827 701 A1 | 6/2021 |
| JP | S57-000695 A | 1/1982 |
| JP | S57-016996 U | 1/1982 |
| JP | S57-205199 U | 12/1982 |

(Continued)

*Primary Examiner* — Shay Karls
(74) *Attorney, Agent, or Firm* — Studebaker & Brackett PC

(57) ABSTRACT

A brush includes a head and a body. The head includes bristles, a diaphragm, and a vibration source attached to the diaphragm. The head is attached to the body. The body includes a circuit configured to supply to the vibration source a supply signal including a non-discrete signal in the audible range.

11 Claims, 10 Drawing Sheets

(56) References Cited

FOREIGN PATENT DOCUMENTS

| | | | |
|---|---|---|---|
| JP | 2003-061986 | A | 3/2003 |
| JP | 2005-221445 | A | 8/2005 |
| JP | 2007-514397 | A | 5/2007 |
| JP | 2009-106355 | A | 5/2009 |
| JP | 2020-018827 | A | 2/2020 |
| KR | 2011-0031604 | A | 3/2011 |
| WO | 2011/126326 | A2 | 10/2011 |
| WO | 2017/028835 | A1 | 2/2017 |

* cited by examiner

BRUSH, REPLACEMENT MEMBER FOR BRUSH, AND METHOD FOR USING BRUSH

CROSS REFERENCE TO RELATED APPLICATIONS

This application claims priority to Japanese Patent Applications No. 2018-138812 filed on Jul. 24, 2018 and No. 2018-220592 filed on Nov. 26, 2018, the entire contents of which are incorporated herein by reference.

TECHNICAL FIELD

The present disclosure relates to a brush, a replacement member for the brush, and a method for using the brush.

BACKGROUND

For example, electric toothbrushes are commercially available.

SUMMARY

A brush according to the present disclosure includes a head and a body. The head includes bristles, a diaphragm, and a vibration source attached to the diaphragm. The head is attached to the body. The body includes a circuit configured to supply to the vibration source a supply signal including a non-discrete signal in the audible range.

DETAILED DESCRIPTION

Hereinafter, embodiments of the present disclosure will be described.

Figure 1:
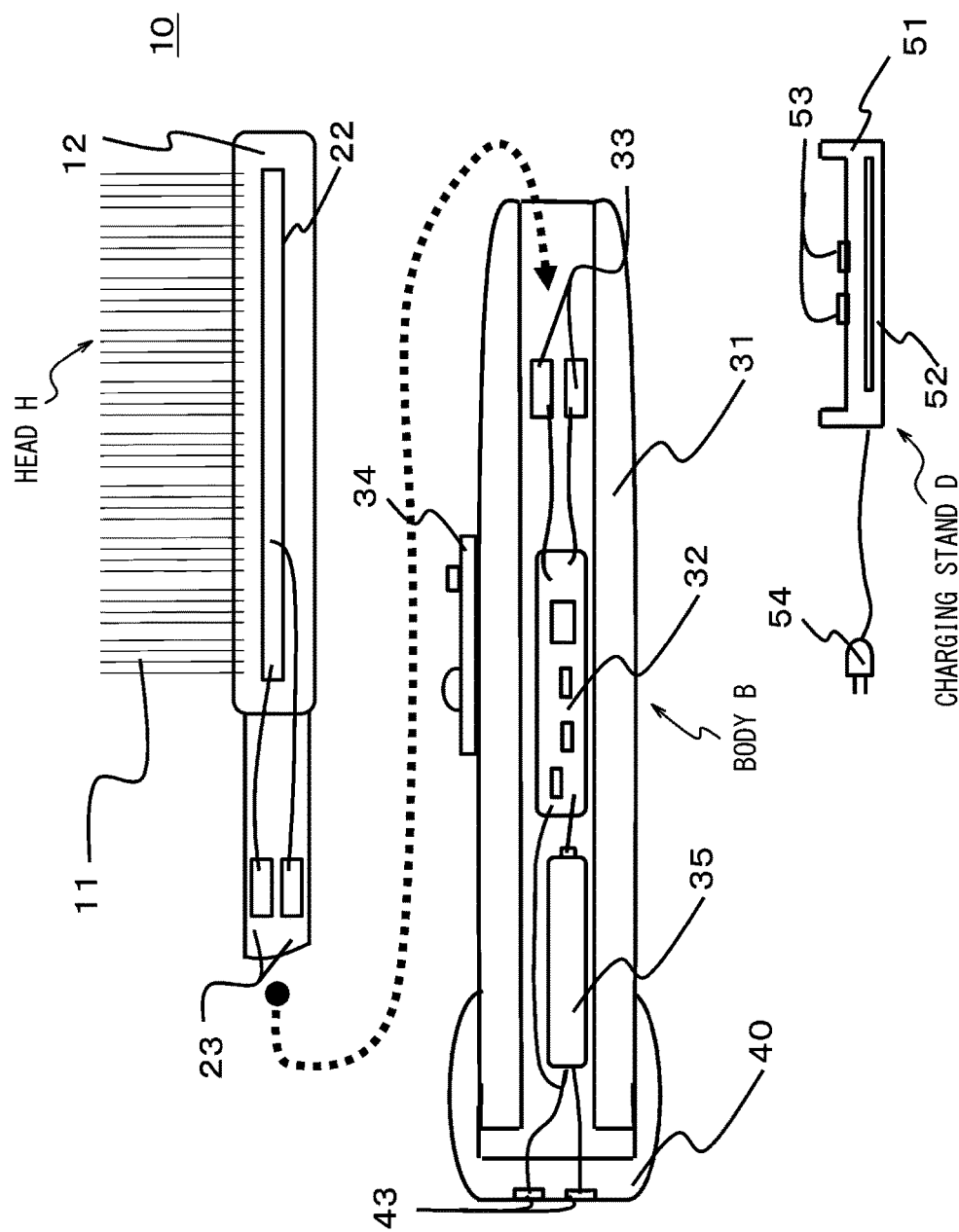
FIG. 1 is a cross-sectional view illustrating a first example configuration.
Figure 2:
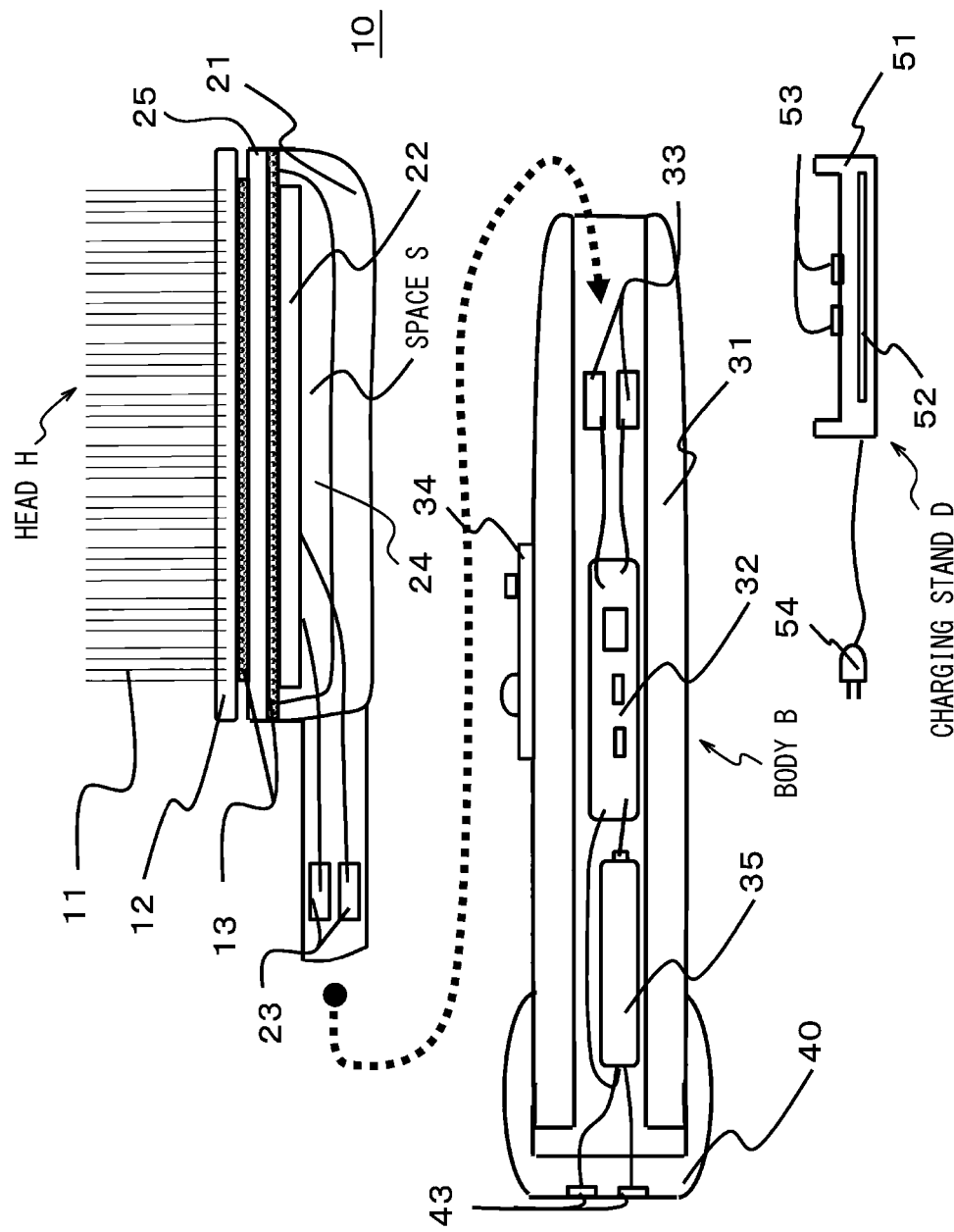
FIG. 2 is a cross-sectional view illustrating a second example configuration.
Figure 3:
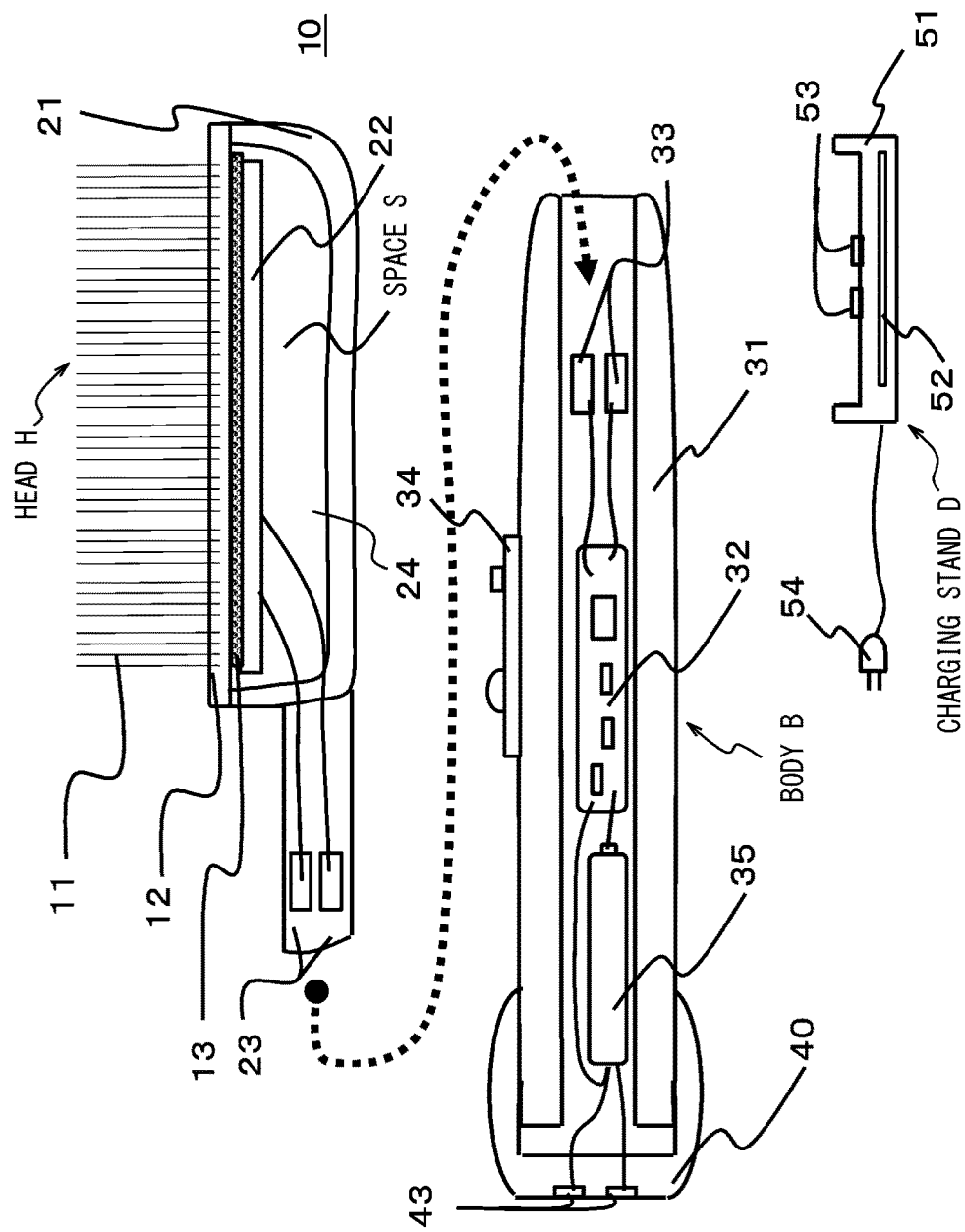
FIG. 3 is a cross-sectional view illustrating a third example configuration.
Figure 4A:
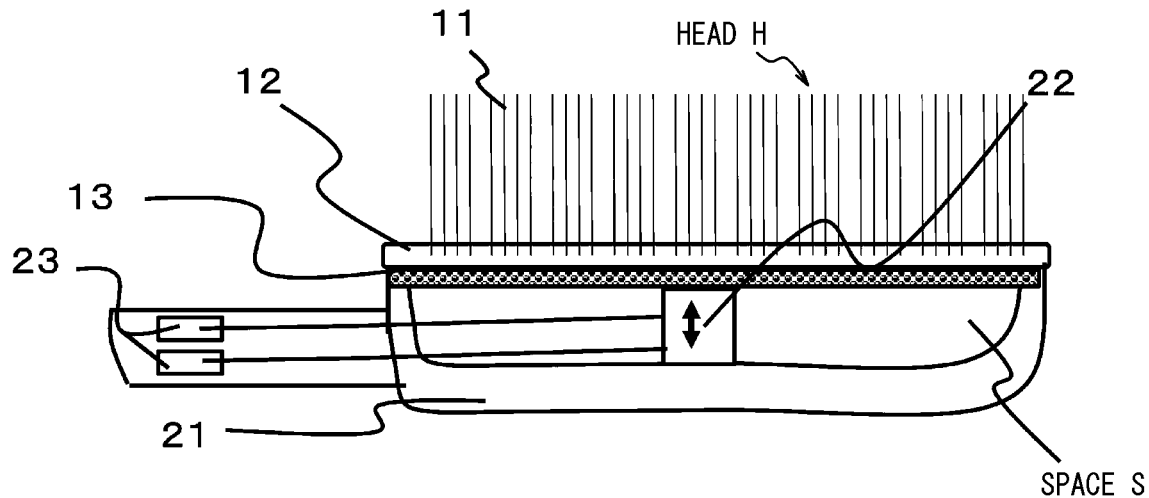
FIG. 4A is a cross-sectional view illustrating a fourth example configuration.
Figure 4B:
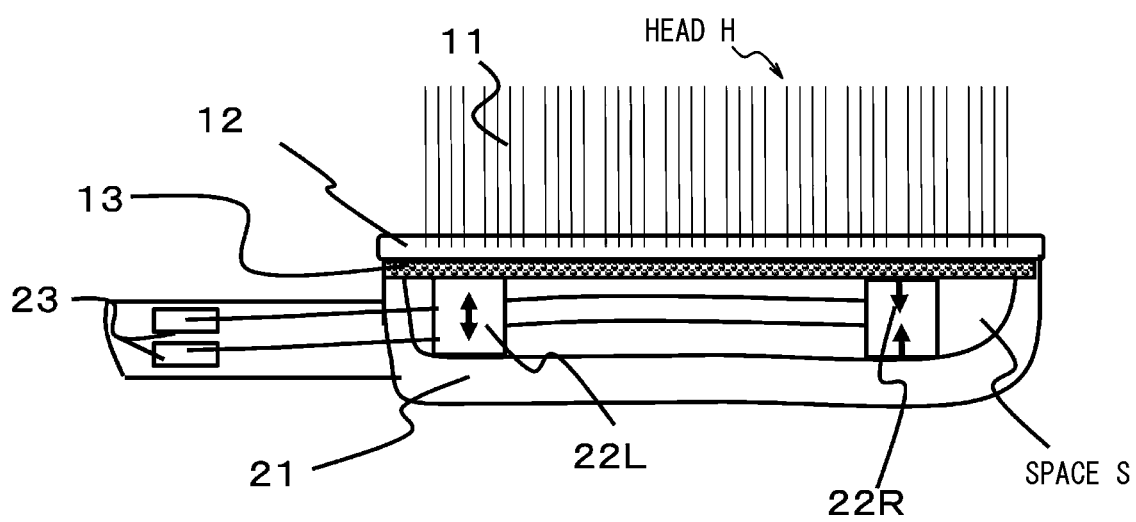
FIG. 4B is a cross-sectional view illustrating the fourth example configuration.
Figure 10:
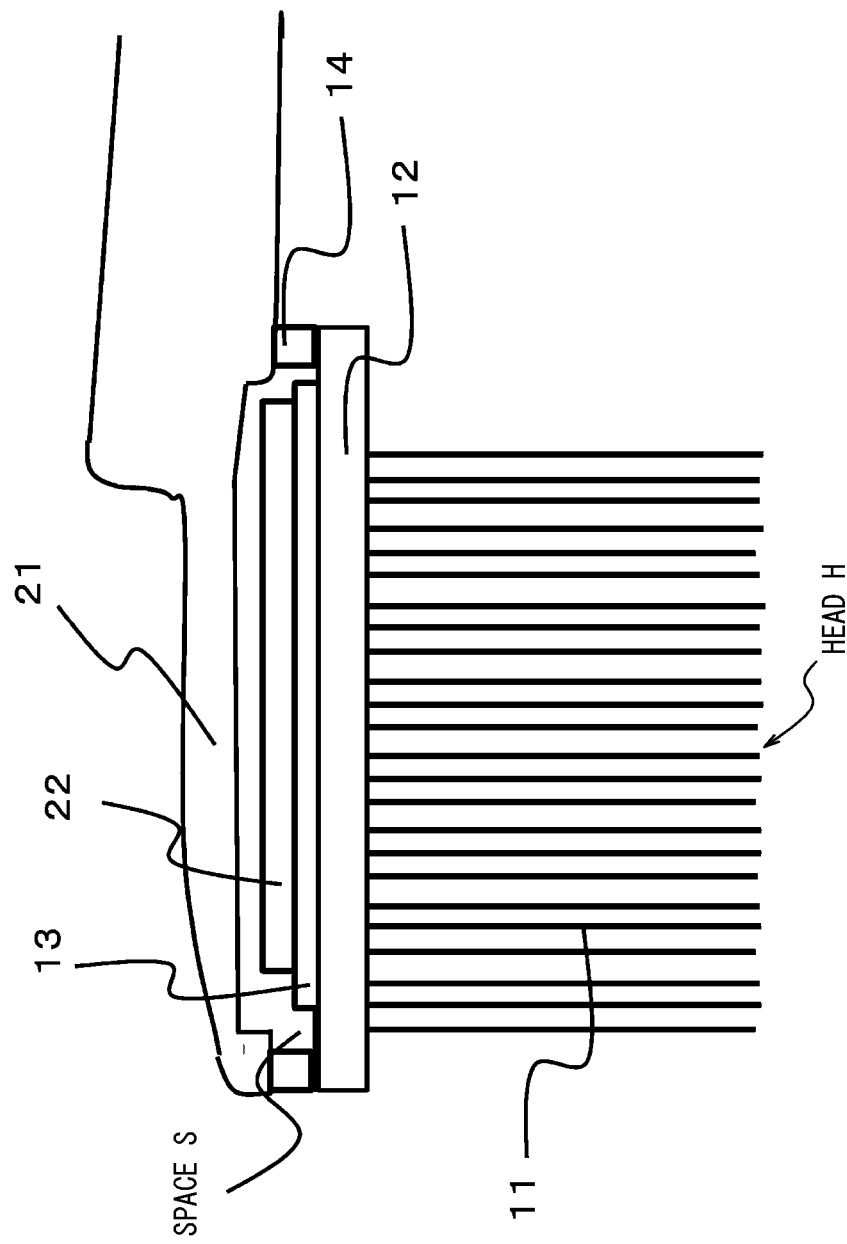
FIG. 10 is a cross-sectional view illustrating a fifth example configuration.

FIG. 1 is a cross-sectional view illustrating a first example configuration of a brush 10 according to the present embodiment. FIG. 2 is a cross-sectional view illustrating a second example configuration of the brush 10 according to the present embodiment. FIG. 3 is a cross-sectional view illustrating a third example configuration of the brush 10 according to the present embodiment. FIG. 4A and FIG. 4B are cross-sectional views illustrating a fourth example configuration of the brush 10 according to the present embodiment. FIG. 10 is a cross-sectional view illustrating a fifth example configuration of the brush 10 according to the present embodiment. The brush 10 will be described to be a toothbrush by way of example and may be a different type of a brush.

For example, the toothbrush may roughly include three members. A first member is a head H that includes bristles 11. A second member is a handle, that is, a body B provided with a handle 31. A third member is a charging stand D, which can be convenient in a case in which a rechargeable battery is used but is not necessary in a case in which, for example, a dry battery is used.

Hereinafter, the present embodiment will be described with reference to FIG. 1 to FIG. 3. Note that the scale in each figure is changed as appropriate, for easy understanding.

The first example configuration will be described with reference to FIG. 1. The head H includes the bristles 11, a diaphragm 12, a piezoelectric element 22, and an electrode pad 23.

The bristles 11 are formed from, for example, an aggregate of nylon strings having a diameter of approximately 0.1 to 0.4 mm. The bristles 11 are composed of bundles respectively including approximately 15 to 20 nylon strings in a length of approximately 30 to 40 mm that are folded in half in the middle and inserted into respective holes of the diaphragm 12, which will be described later. That is, after the insertion, each hole holds a bundle of approximately 30 to 40 nylon strings. After the insertion, the bristles 11 are cut to a uniform length. The length of a protruding portion of each bristle 11 to the tip thereof from the diaphragm 12 is, for example, 0.7 mm to 13 mm. The bristles 11 may be cut to have a flat cut surface or a sawtooth-like jagged surface.

The diaphragm 12 may be formed from a plastic material such as acrylic or polycarbonate. On the surface of the diaphragm 12, approximately 24 to 36 holes each having a diameter of approximately 1.3 mm to 2.1 mm are formed to insert the bristles 11 described above. The bristles 11 are pressed into the holes. In an example, a surface of the diaphragm 12 having the holes formed thereon (it will be referred to as a hole-side surface) has a transverse length of 15 to 35 mm, a longitudinal length of 8 to 15 mm, and a thickness of 2 to 10 mm, which is orthogonal to the surface and includes a thickness of the piezoelectric element 22.

The piezoelectric element 22 is embedded in the diaphragm 12. The diaphragm 12 simply needs to include a portion having a plate-like shape to arrange the bristles 11 of the brush 10 thereon and is not necessarily limited to have a plate-like shape in its entirety.

The piezoelectric element 22 has a plate-like shape and a largest surface (hereinafter, referred to as a first surface) located opposing the hole-side surface. A longitudinal length of the first surface may be approximately 0.5 to 0.9 times (15 to 35 mm) a transverse length of the hole-side surface. The transverse length of the first surface of the piezoelectric element 22 may be approximately 0.5 to 0.9 times (5 to 15 mm) the longitudinal length of the hole-side surface. A thickness of the piezoelectric element 22 may be approximately 0.3 to 2.0 mm.

The piezoelectric element 22 is an element that expands or contracts, or bends (curves), according to an electromechanical coupling coefficient of a constituent material thereof upon application of a supply signal (a voltage). The element may be formed from, for example, ceramic or quartz. The piezoelectric element 22 may be a unimorph, a bimorph, or a laminated piezoelectric element. The laminated piezoelectric element includes a laminated unimorph element in which unimorphs are laminated (e.g., approximately 16 to 44 layers) or a laminated bimorph element in which bimorphs are laminated (e.g., approximately 16 to 44 layers). The laminated piezoelectric element has a laminated structure including a plurality of dielectric layers made of, for example, PZT (lead zirconate titanate) and electrode layers arranged between the plurality of dielectric layers. First, the first surface of the piezoelectric element 22 expands in a longitudinal direction and, simultaneously, a surface on an opposite side of the first surface contracts along the longitudinal direction, whereby the piezoelectric element 22 bends in the thickness direction. Subsequently, the first surface contracts along the longitudinal direction and, simultaneously, the surface on the opposite side of the first surface expands along the longitudinal direction, whereby the piezoelectric element 22 bends in a direction opposite from the previous direction with respect to the thickness direction. The above operation is repeated to generate a vibration. An electrode wiring connected to the piezoelectric element 22 is connected to the electrode pad 23.

The piezoelectric element 22 bends according to a supply signal, which will be described later. Then, the diaphragm 12 is vibrated in a bending manner according to the bending of the piezoelectric element 22. As a result, the bristles 11 also vibrate and function as a brush.

The electrode pad 23 is formed to be exposed from the surface at the one end of the diaphragm 12. When the one end of the diaphragm 12 is inserted into the body B, which will be described later, the electrode pad 23 is electrically connected to an electrode pad 33 of the body B.

The body B may include the handle 31 serving as a handle, a substrate 32 having a control system, a memory, and the like mounted thereon, the electrode pad 33 described above, a cap 40, a battery 35, and an operation unit 34.

The handle 31 has, for example, a cylindrical shape, into which the one end of the diaphragm 12 is inserted, and thus has a function as a support for the head H. The handle 31 also has a function as a handle to be gripped by a user. The handle 31 may further have a function as a housing for enclosing the substrate 32, the battery 35, and the like therein. The handle 31 may be formed from a plastic material, in a manner similar to the diaphragm 12. Alternatively, the handle 31 may be formed from a metal material such as aluminum or stainless steel, or tempered glass. The handle 31 has a length of, for example, approximately 10 cm to 25 cm. An outer diameter of the cylindrical shape of the handle 31 is approximately 1 to 3 cm. An inner diameter of the cylindrical shape of the handle 31 to enclose one end of the head H is approximately 0.5 to 2 cm. Note that the dimensions are not limited to those described above. Preferably, in a state in which the one end of the head H is enclosed, a space enclosing the substrate 32 and the like is sealed. A diameter (an outer diameter) of the one end of the head H and the inner diameter of the handle 31 are matched with each other, or a seal or the like is used, to realize a waterproof structure.

Figure 5:
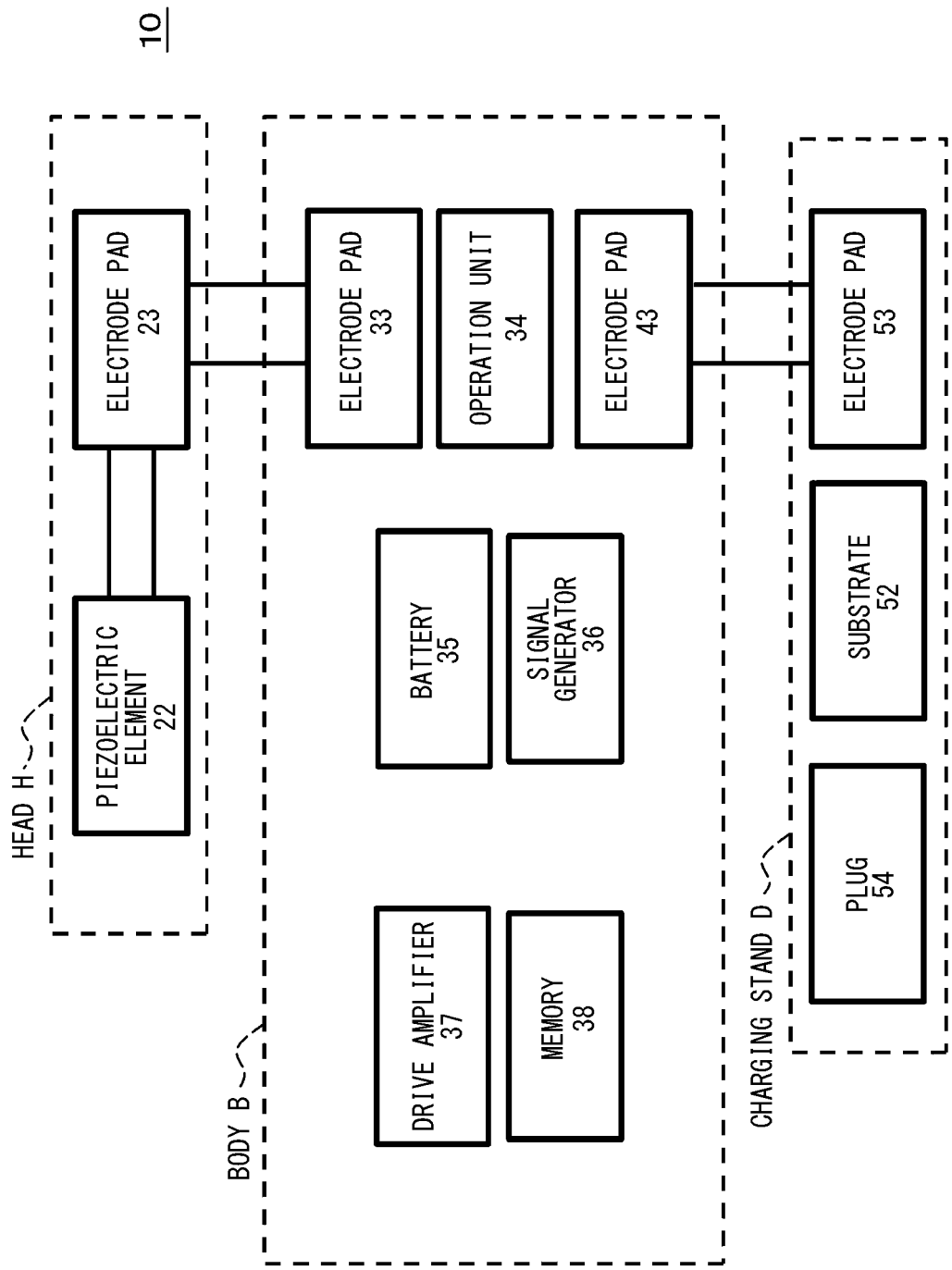
FIG. 5 is a block diagram illustrating an example.

The substrate 32 can be enclosed in an internal space of the cylindrical shape that has a waterproof structure. Each functional unit of the body B illustrated in the block diagram of FIG. 5 is mounted on the substrate 32. For example, a signal generator 36, a drive amplifier 37, a memory 38, and the like are mounted on the substrate 32.

Figure 7:
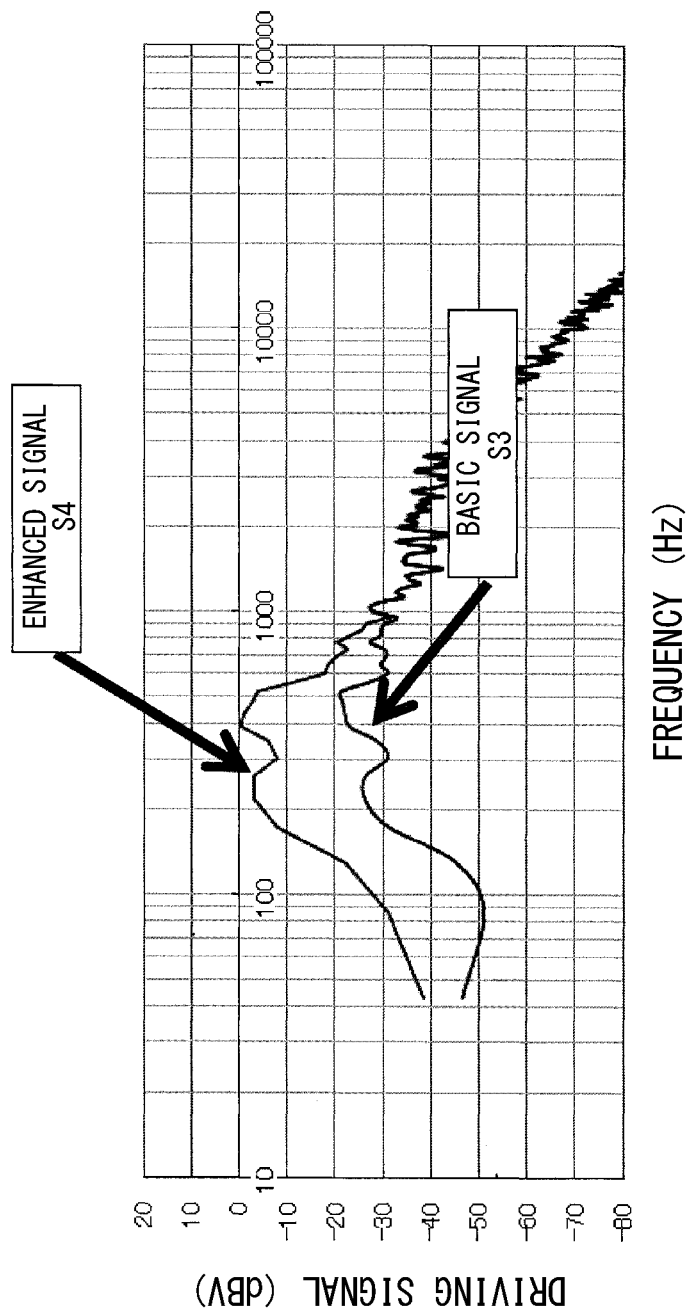
FIG. 7 is a diagram illustrating frequency characteristics with and without the emphasis correction in the specific frequency band.
Figure 8:
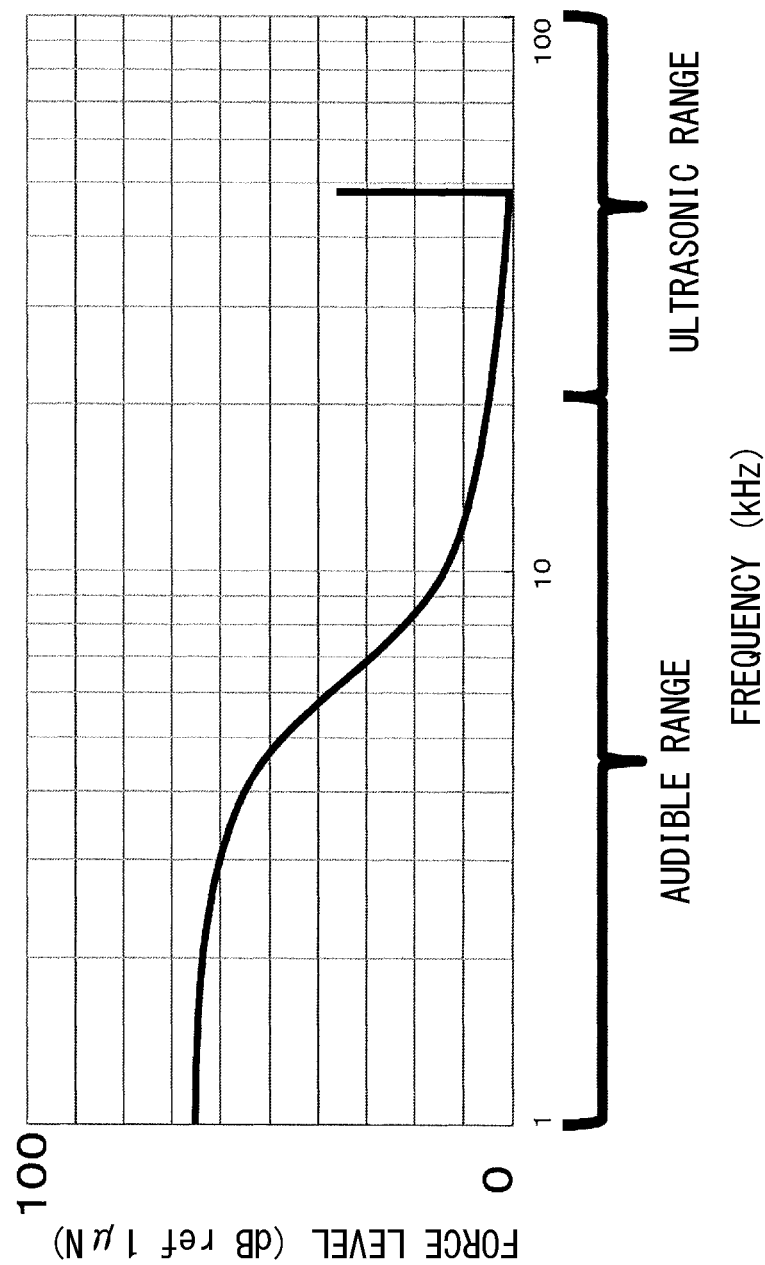
FIG. 8 is a diagram illustrating frequency characteristics of a supply signal set to operate in the audible frequency band and the ultrasonic frequency band.

A driving signal is supplied to the piezoelectric element 22 via the electrode pad 33, the electrode pad 23, and the like. The driving signal has frequency characteristics as illustrated in FIG. 7 and FIG. 8, by way of example.

The operation unit 34 may include a power switch (e.g., a button switch) for switching ON or OFF the brush 10 and adjustment switches (e.g., a + button and a − button) for adjusting the volume. The switches are arranged on the handle 31. The user can operate each switch from the outside of the handle 31. For example, a waterproof sheet may be attached to the outer surface of the handle 31, and the switches may be arranged under the waterproof sheet.

The battery 35 is enclosed in the handle 31. The battery 35 stores electric power supplied from the electrode pad 43 and supplies electric power to the substrate 32, according to a user operation in respect to the operation unit 34, which will be described later. The battery 35 may be a dry battery.

The cap 40 is attached to an end portion of the handle 31 opposite from the side where the head H is to be inserted. The cap 40 seals the internal space that encloses the battery 35 and the substrate 32. Further, the cap 40 has an exposed surface on which an electrode pad 43 is arranged.

The electrode pad 43 constitutes a part of a power line circuit for transmitting electric power to the battery 35 from the electrode pad 53 of the charging stand D. The electrode pad 43 further constitutes a part of a signal line circuit used for storing a supply signal, music data, or the like in the memory 38.

The charging stand D includes a housing 51, a substrate 52, an electrode pad 53, and a plug 54. The housing 51 of the charging stand D has a main surface having a flat plate-like shape capable of mounting the body B thereon. An electrode pad 53 is arranged on the main surface and is electrically connected to the electrode pad 43 of the body B. The housing 51 encloses the substrate 52 which has a function to convert AC power supplied from a commercial power grid via the plug 54 into DC power and transform a voltage of the DC power.

When the bristles 11 of the head H are to be replaced due to abrasion or deterioration, a brand new head H can be purchased and used by connecting the electrode pad 23 and the electrode pad 33.

Next, the second example configuration will be described with reference to FIG. 2. In particular, aspects different from FIG. 1 will mainly be described. The aspects different from the first example configuration illustrated in FIG. 1 is, in particular, the configuration of the head H. The head H of the second example configuration includes a first part including the bristles 11 and the diaphragm 12 and a second part including a housing 21, the piezoelectric element 22, the electrode pad 23, wiring, and the like. The first part and the second part are attached together by an adhesive member 13. As the adhesive member 13, for example, a thermosetting material, a UV curable material, a double-sided tape, or the like can be used. The housing 21 of the second part includes a recess 24 and a lid 25 for sealing the recess 24. The lid 25 has the piezoelectric element 22 attached thereto by the adhesive member 13. That is, the piezoelectric element 22 is enclosed in the recess 24. A space S is formed in the recess 24 to avoid obstruction of the bending of the piezoelectric element 22. That is, a depth of the recess 24 is designed calculating a maximum amplitude of the piezoelectric element 22 during bending, the thickness of the piezoelectric element 22, a thickness of the adhesive member 13, and a contraction rate. The recess 24 and the lid 25 are attached together by the same adhesive member 13 as that attaches the piezoelectric element 22 and the lid 25 together. However, these elements may be attached by different adhesive members. The recess 24 and the lid 25 may be attached together by heat welding or ultrasonic welding, rather than using an adhesive member.

In the second example configuration, because the head H is separated into the first part and the second part, when, for example, the bristles 11 are to be replaced due to deterioration or abrasion, it is required to simply replace the first part alone, and the second part does not need to be discarded together with the first part that is worn out. Thus, the brush 10 can be environmentally friendly.

Next, the third example configuration will be described with reference to FIG. 3. In particular, an aspect different from FIG. 1 and FIG. 2 will mainly be described. The aspect different from the first and second example configurations illustrated in FIG. 1 and FIG. 2 is, in particular, the configuration of the head H.

The third example configuration includes the bristles 11, the diaphragm 12, the adhesive member 13, the housing 21, the piezoelectric element 22, the electrode pad 23, and the like. The piezoelectric element 22 is attached to the diaphragm 12 via the adhesive member 13. The diaphragm 12 functions as a support member for the bristles 11, a support member for the piezoelectric element 22, and a lid for the housing 21. Because the piezoelectric element 22 directly bends the diaphragm 12, a vibration stronger than those of the second example configuration illustrated in FIG. 2 can be easily obtained. On the other hand, because the head H is not separated into parts unlike the head H illustrated in FIG. 2, the example configuration illustrated in FIG. 2 has better maintainability. In a manner similar to FIG. 2, the recess 24 of the housing 21 has the space S formed therein that is designed calculating the thickness of the piezoelectric element 22, the thickness of the adhesive member 13, the thickness of the adhesive member 13, and the contraction rate, to avoid obstruction of the bending of the piezoelectric element 22.

Next, the fourth example configuration will be described with reference to FIG. 4A and FIG. 4B. In two examples illustrated in FIG. 4A and FIG. 4B, unlike the piezoelectric element 22 having the plate-like shape illustrated in FIG. 1, FIG. 2, and FIG. 3, the piezoelectric elements 22, 22L, and 22R extend in a transverse direction (transverse direction: the extending direction of the bristles 11). Each of the piezoelectric elements 22, 22L, and 22R is formed from a sintered body in which ceramic layers having a diameter of, for example, 1 mm to 10 mm are laminated in the transverse direction by 0.5 mm to 5 mm. Unlike the piezoelectric element 22 of the first, second, and third example configurations, the piezoelectric elements 22, 22L, and 22R of the fourth example configuration repeatedly expand and contract in the transverse direction upon application of a voltage. In the example illustrated in FIG. 4A, the piezoelectric element 22 is arranged in columns in the space of the housing 21 and expands and contracts in the transverse direction. In response to such an expansion and contraction movement, the diaphragm 12 is vibrated in a curved manner. By repeating this operation, the bristles 11 can be vibrated.

Further, in the example illustrated in FIG. 4B, two piezoelectric elements 22: a right piezoelectric element 22R and a left piezoelectric element 22L are used. A voltage may be applied such that both the right piezoelectric element 22R and the left piezoelectric element 22L move in the same manner and cause a reciprocating motion of the diaphragm 12 in the transverse direction. By repeating this, the bristles 11 can be vibrated. Alternatively, opposite voltages may be applied to the right piezoelectric element 22R and the left piezoelectric element L. In this case, when the piezoelectric element 22R expands at first, the piezoelectric element 22L contracts, whereby the right side of the diaphragm 12 moves up in the transverse direction and the left side moves down in the transverse direction. At the next moment, as indicated by arrows in the figure, the piezoelectric element 22R contracts and the piezoelectric element 22L expands, whereby the right side of the diaphragm 12 moves down in the transverse direction, and the left side moves up in the transverse direction. By repeating this operation, the bristles 11 can be vibrated. In both examples illustrated in FIG. 4A and FIG. 4B, a sound can be reproduced coinciding with the vibration.

Next, an embodiment illustrated in FIG. 5 will be described, together with an electrical connection relationship such as a circuit configuration and the like. The charging stand D includes, for example, a plug 54 to be connected to the commercial power grid of 100 V, 1.5 A, and 50/60 Hz. Electric power supplied from the plug 54 is converted into an appropriate voltage, e.g., DC power of 5V to 20V and 1 A to 5 A by an AD converter and a transformer mounted on the substrate 52. The DC power from the substrate 52 is stored in the battery 35 via electrode pads 53 and 43.

The body B includes the electrode pad 43, the operation unit 34, the battery 35, the memory 38, the signal generator 36, the drive amplifier 37, the electrode pad 33, and the like.

The operation unit 34 may include an ON/OFF changeover switch circuit for the brush 10 and a volume adjustment circuit. The operation unit 34 may further include a switch circuit for music selection. The battery 35 may include a charging circuit and an anti-overcharging circuit. The battery 35 may further include a thermistor.

The memory 38 stores a signal for driving the piezoelectric element 22. In particular, a signal having a predetermined frequency band in the audible range, that is, a signal having a continuous spread that is non-discrete in the frequency of the audible range is stored. The non-discrete signal includes three or more continuous integers n in a graph illustrating the frequency characteristics of the signal, and the integer n becomes a significant signal when the frequency F (Hz)=10×n: (n is an integer of 1 to 2000) is expressed (for example, a supply signal is output when each of n=20, 21, and 22). The non-discrete signal is, for example, an analog or digital audio signal. The audio signal may include a music signal, human conversation data, a singing voice, or the like. Here, the non-discrete signal does not include a signal that presents a single frequency alone, which is so-called a pure tone in the field of acoustics, or a driving signal for driving, for example, a motor or the like at a single rotation speed. Also, the non-discrete signal does not include a signal that includes a plurality of pure tones alone, because such a signal is discrete. Further, the non-discrete signal does not include a signal that includes, for example, a pure tone of 200 Hz and a pure tone of 10 kHz alone, because there are only two ns (n=20, n=1000) in the above equation and they are not continuous with each other.

The signal stored in the memory 38 may further include an ultrasonic signal corresponding to a frequency of, for example, 20 kHz to 100 kHz. The ultrasonic signal may be discrete.

Further, the signal stored in the memory 38 may be encoded and compressed.

The memory 38 for storing such signals may be a non-volatile memory. For example, the memory 38 may be an SD memory card (SDHC, SDXC, or the like) that may be removably attached by removing the cap 40. In a case in which the SD memory card is used, the user may store user's favorite music in the memory 38 using a personal computer or a smartphone and play the music with the toothbrush.

The signal generator 36 converts the signal stored in the memory 38 into the supply signal to be supplied to the piezoelectric element 22. In some cases, this conversion is not necessary. A predetermined frequency band of the supply signal is enhanced, and then the supply signal is supplied to the piezoelectric element 22 via the drive amplifier 37, the electrode pads 33, 23, and the like.

Next, the signal supplied to the piezoelectric element 22 will be described. The signal supplied to the piezoelectric element 22 is referred to as a supply signal. For example, the supply signal includes a continuous signal in a predetermined range of frequency characteristics, that is, a non-discrete signal in a predetermined range, in a manner similar to the non-discrete signal from among the signals stored in the memory 38 described above. For example, of the supply signals illustrated in FIG. 6, a basic signal S1 (dotted line) is a signal of 40 Hz to 20 kHz having non-discrete and flat frequency characteristics. An enhanced signal S2 obtained by enhancing the frequency characteristics in the low frequency band of the basic signal S1, in this case 100 Hz to 500 Hz, by approximately 20 dB may be supplied to the piezoelectric element 22. By locally increasing the signal power in the low frequency band mentioned above, a brushing effect is expected to improve. The enhanced signal S2 may be obtained by subjecting the basic signal S1 output from the memory 38 to an equalizer when subjecting it to the drive amplifier 37 to enhance a frequency band of interest (i.e., a signal generation process), and the enhanced signal S2 thus obtained may be supplied to the piezoelectric element 22. Needless to say, the enhanced signal S2 itself may be stored in the memory 38 in advance.

Next, the supply signal that causes output of music from the toothbrush will be described with reference to FIG. 7. The signal may be, for example, a music basic signal S. In this case, the piezoelectric element 22 generates a bending vibration according to the music basic signal S3. For example, the diaphragm 12 illustrated FIG. 1 to FIG. 3 bends according to the bending of the piezoelectric element 22. By repeating the bending according to the supply signal, music is reproduced. An enhanced signal S4 obtained by enhancing the frequency characteristics in the low frequency band of the basic signal S3, in this case 200 Hz to 500 Hz, by approximately 20 dB may be supplied to the piezoelectric element 22. By increasing the signal power in the low frequency band, the brushing effect is expected to improve. The enhanced signal S4 may be obtained by subjecting the basic signal S3 output from the memory 38 to the equalizer when subjecting it to the drive amplifier 37 to enhance a frequency band of interest (i.e., a signal generation process), and the enhanced signal S4 thus obtained may be supplied to the piezoelectric element 22. Needless to say, the enhanced signal S4 itself may be stored in the memory 38 in advance. Note that the volume or brushing power may be operated by switching a mode of the volume adjustment switch of the operation unit 34. The mode may be changed by, for example, pressing or holding down the power switch. In particular, a volume adjustment mode and a brushing intensity adjustment mode may be provided. When the adjustment switch is operated in the volume adjustment mode, the magnitude of electric power supplied to the piezoelectric element 22 is changed to increase the volume of music in its entirely, regardless of a specific frequency. On the other hand, in the brushing intensity adjustment mode, the magnitude of electric power supplied to the piezoelectric element 22 is changed for a specific frequency band alone. The adjustment method is not limited thereto.

Figure 6:
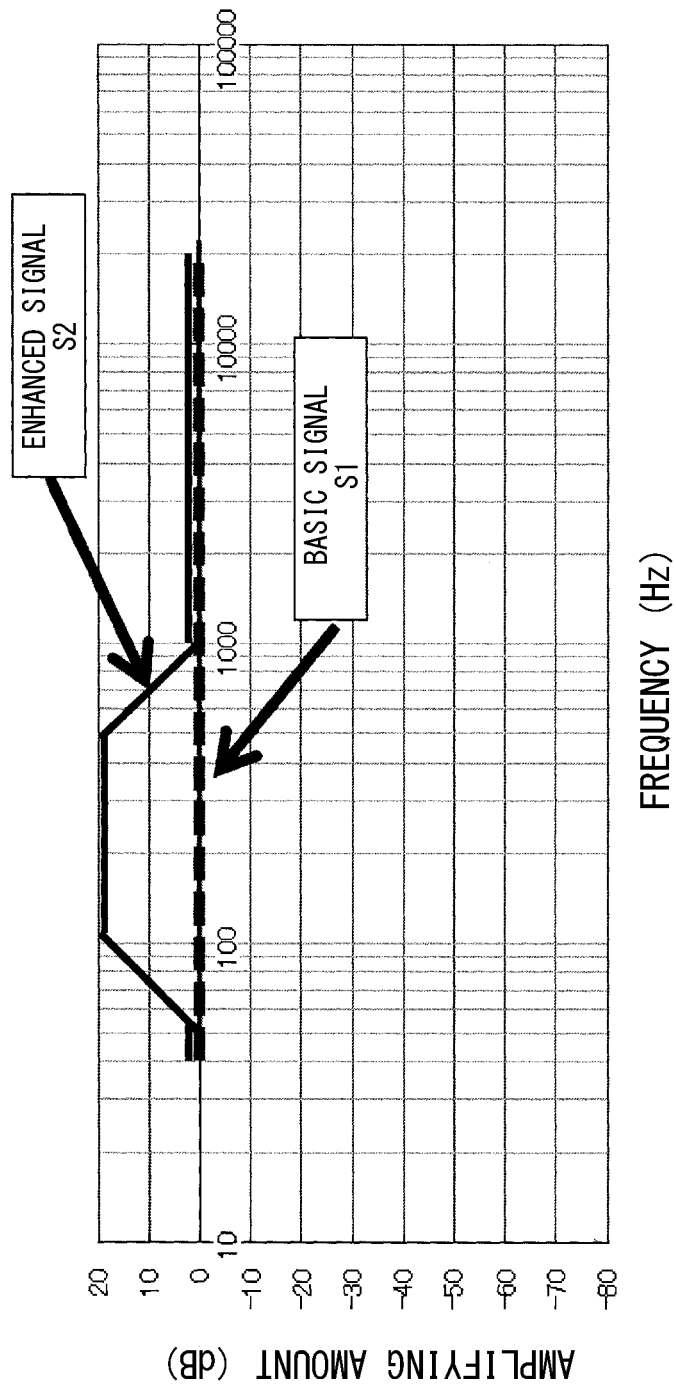
FIG. 6 is a diagram illustrating signal processing correction characteristics with and without emphasis correction in a specific frequency band.

As illustrated in FIG. 6 and FIG. 7, a continuous signal that is neither delta-functional nor discrete in a predetermined frequency characteristic range in the audible range (10 Hz to 20 kHz) may be supplied to the piezoelectric element 22. As a result, the supply signal for music containing a vibration of various frequencies in the audible range can be supplied to play the music. Also, by changing the music, a vibration in various frequency bands can be obtained. A user may be able to brush the teeth using the toothbrush while playing the user's favorite music.

Further, the piezoelectric element 22 may be vibrated in the ultrasonic band (20 kHz or more) in addition to the audible range (from 10 Hz to 20 kHz). As illustrated in FIG. 8, for example, the piezoelectric element 22 may be vibrated in the vicinity of 50 kHz in addition to a continuous vibration in the audible range (from 10 Hz to 20 kHz). This enables ultrasonic vibration brushing. A signal to cause the ultrasonic vibration may be a pure tone or a discrete signal. The signal may be continuous or non-discrete.

Figure 9:
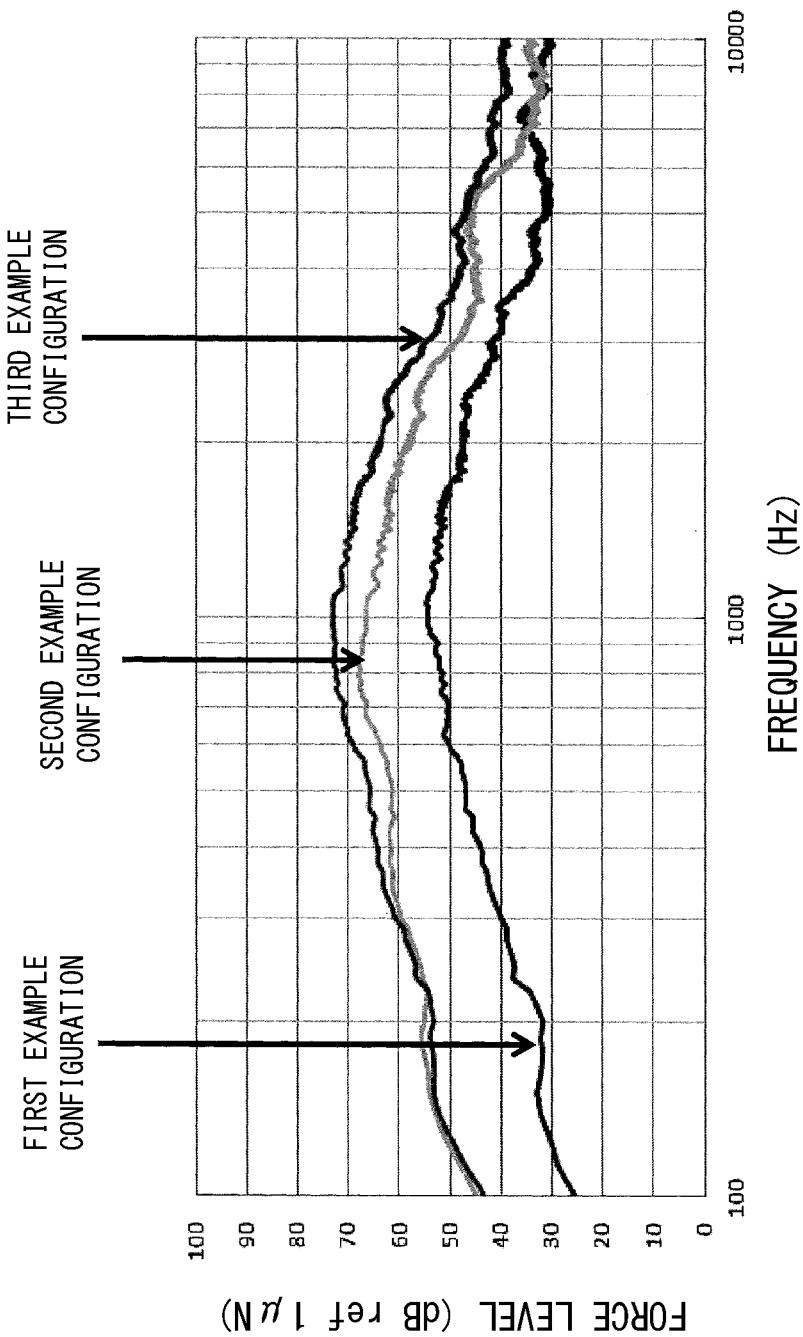
FIG. 9 is a graph illustrating frequency characteristics in association with a force level in each example configuration.

Next, an operation and the like of each example configuration will be described using a graph of frequency characteristics corresponding to each example configuration illustrated in FIG. 1 to FIG. 3 by way of example, with reference to FIG. 9. It can be seen that in each example configuration the vibration generated at the diaphragm 12 have a sufficient magnitude, and thus the user can listen to music while using the toothbrush. A measurement result is obtained by pressing the bristles 11 of the head H at a pressure of approximately 1N against a measurement surface of a measuring instrument called an artificial mastoid.

In the first example configuration illustrated in FIG. 1, because the piezoelectric element 22 is embedded in the diaphragm 12, when the piezoelectric element 22 bends, the diaphragm 12 also bends. By repeating the bending in a manner as to alternatively protrude upward and downward according to the frequency, the diaphragm 12 is vibrated and the brush 10 can be used as the toothbrush. Simultaneously, a sound corresponding to the frequency is also generated. Thus, a song or a voice can be played. The piezoelectric element 22 is embedded in a resin material such as acrylic or the like forming the diaphragm 12. This simple configuration has an advantage to facilitate realization of a waterproof structure around the piezoelectric element 22.

In the second example configuration illustrated in FIG. 2, because the piezoelectric element 22 is attached to the lid 25 of the housing 21 by the adhesive member 13, when the piezoelectric element 22 bends, the lid 25 of the housing 21 also bends. Because the lid 25 is attached to the diaphragm 12 by the adhesive member 13, the diaphragm 12 also bends, as a result. By repeating the bending in a manner as to alternately protrude upward and downward, the diaphragm 12 is vibrated also alternately protruding upward and downward and the brush 10 can be used as the toothbrush. Simultaneously, a sound corresponding to the frequency is generated. Thus, a song or a voice can be played. Because the first part including the diaphragm 12 and the second part including the housing 21 are used, the second example configuration has excellent maintainability.

In the third example configuration illustrated in FIG. 3, the piezoelectric element 22 is attached to the diaphragm 12 via the adhesive member 13. Thus, when the piezoelectric element 22 bends, the diaphragm 12 also bends. By repeating the bending in a manner as to alternatively protrude upward and downward according to the frequency, the diaphragm 12 is vibrated and thus the bristles 11 are also vibrated, whereby the brush 10 can be used as the toothbrush. Simultaneously, a corresponding sound is generated. That is, a song or a voice can be played. The third example configuration has an advantage that vibration can be stronger than the second example configuration.

Although in some of the examples described above the piezoelectric element 22 having the flat plate-like shape is used as the vibration source, the vibration source is not limited thereto. As illustrated in FIG. 4A and FIG. 4B, for example, a piezoelectric stack that includes layers laminated in one direction and expands and contracts in the direction by moving the laminated layers away from one another or toward one another may be used. Further, the vibration source is not limited to the piezoelectric element. For example, the vibration source may be a coil-type vibration element. The coil-type vibration element may vibrate a cone in an up-down direction in a manner similar to that used in a speaker and may be attached to a lower portion of the diaphragm 12 such that an inertial force of an up-down movement of the coil-type vibration element along the up-down direction (i.e., the extending direction of the bristles 11) vibrates the diaphragm 12. Thus, a vibration and a voice can be simultaneously generated.

In the present disclosure, because the diaphragm 12 is bent by arranging the vibration source such as the piezoelectric element 22 in the head H rather than in the body B, the user can hear a sound (a bone conduction sound of the tooth) caused by a vibration of the teeth when the brush 10 is brought into contact with the teeth. That is, the sound heard by the user when the bristles 11 of the brush 10 are brought into contact with the teeth is louder than a sound heard by the user when the bristles 11 of the brush 10 are not brought into contact with the teeth. Thus, this configuration may, for example, tempt an infant to voluntarily bring the brush 10 into contact with the teeth to make a sound.

Although the toothbrush has been described above, the brush according to the present disclosure is not limited thereto. For example, a brush or a deck brush for washing cooking utensils such as pots are also applicable. In that case, the piezoelectric element 22 and other elements may be enlarged according to the application, without altering the basic configuration. Further, when the bristles 11 of the brush 10 properly contact an object, the object vibrates and generates a sound, which can make household chores fun.

In the embodiment illustrated in FIG. 10, further, the diaphragm 12, the floating member 14, and the housing 21 are integrally molded. The floating member 14 may be an annular member formed from, for example, a polyurethane or a silicone member. The piezoelectric element 22 is interposed between the diaphragm 12 and the housing 21 in a manner being surrounded by them. This configuration facilitates the vibration of the diaphragm 12 while maintaining waterproof properties.

As described above, the brush according to the present embodiment includes a head and a body. The head includes bristles, a diaphragm, and a vibration source attached to the diaphragm. The head is attached to the body. The body includes a circuit configured to supply to the vibration source a supply signal including a non-discrete signal in the audible range.

In one embodiment, the vibration source is configured to bend the diaphragm directly or indirectly.

In one embodiment, the vibration source is configured to vibrate, whereby the bristles are vibrated and a sound is generated from the diaphragm.

In one embodiment, the supply signal includes a signal in the ultrasonic band.

In one embodiment, the supply signal includes a music signal.

In one embodiment, the supply signal is supplied to the vibration source as an enhanced signal obtained by amplifying a predetermined frequency range using a drive amplifier.

A replacement member for the brush according to the present embodiment includes a head. The head can be attached to a body of the brush and includes bristles, a diaphragm, and a vibration source that is attached to the diaphragm and vibrates according to a supply signal including a non-discrete signal in the audible range.

A method for using the brush according to the present embodiment includes vibrating bristles of the brush to brush an object and, simultaneously, vibrating the object with a vibration transmitted from the bristles of the brush to generate a non-discrete sound in the audible range.

The invention claimed is:

1. A brush comprising:
a head including bristles, a diaphragm, and a vibration source attached to the diaphragm; and
a body to which the head is attached, the body including a circuit configured to supply to the vibration source a supply signal including a non-discrete signal in an audible range, wherein
the supply signal includes an enhanced signal in which frequency characteristics of a music basic signal are enhanced only in a lower frequency range including a band of about 200 Hz to 500 Hz.

2. The brush according to claim 1,
wherein the vibration source is configured to bend the diaphragm directly or indirectly.

3. The brush according to claim 1,
wherein the vibration source is configured to vibrate, whereby the bristles are vibrated and a sound is generated from the diaphragm.

4. The brush according to claim 1,
wherein the supply signal includes a signal in an ultrasonic band.

5. A replacement member for a brush comprising:
a head that can be attached to a body of the brush and includes bristles, a diaphragm, and a vibration source that is attached to the diaphragm and vibrates according to a supply signal including a non-discrete signal in an audible range, wherein
the supply signal includes an enhanced signal in which frequency characteristics of a music basic signal are enhanced only in a lower frequency range including a band of about 200 Hz to 500 Hz.

6. The brush according to claim 1, wherein the body comprises a drive amplifier, and the enhanced signal is obtained by enhancing the frequency characteristics of the music basic signal only in the lower frequency range at the drive amplifier.

7. The brush according to claim 1, wherein the body comprises a memory, and the enhanced signal is stored in the memory.

8. The brush according to claim 1, wherein the supply signal includes a signal in which frequency characteristics of the music basic signal in a band lower than the band of about 200 Hz to 500 Hz are enhanced by at least 20 dB.

9. The brush according to claim 1, wherein the body comprises an operation unit, and the enhanced signal is obtained by a user operation from the operation unit.

10. A brush comprising:
a head including bristles, a diaphragm, and a vibration source attached to the diaphragm; and a body to which the head is attached, the body including a circuit configured to supply to the vibration source a supply signal including a non-discrete signal in an audible range, wherein the head further includes a housing and a floating member that is at least partially exposed to an outside of the head, the floating member being interposed between the diaphragm and the housing in a manner surrounding the vibration source, and connecting the diaphragm to the housing.

11. A replacement member for a brush comprising:

a head that can be attached to a body of the brush and includes bristles, a diaphragm, and a vibration source that is attached to the diaphragm and vibrates according to a supply signal including a non-discrete signal in an audible range, wherein the head further includes a housing and a floating member that is at least partially exposed to an outside of the head, the floating member being interposed between the diaphragm and the housing in a manner surrounding the vibration source, and connecting the diaphragm to the housing.

* * * * *